United States Patent
Huang et al.

(10) Patent No.: US 12,386,407 B2
(45) Date of Patent: Aug. 12, 2025

(54) SYSTEM, METHOD AND/OR APPARATUS FOR CONTROLLING A POWER SIGNAL

(71) Applicant: Arm Limited, Cambridge (GB)

(72) Inventors: Chi-Hsiang Huang, Seattle, WA (US); Shidhartha Das, Upper Cambourne (GB); Benoit Labbe, Cambridge (GB)

(73) Assignee: Arm Limited, Cambridge (GB)

( * ) Notice: Subject to any disclaimer, the term of this patent is extended or adjusted under 35 U.S.C. 154(b) by 242 days.

(21) Appl. No.: 17/818,670

(22) Filed: Aug. 9, 2022

(65) Prior Publication Data
US 2024/0053401 A1   Feb. 15, 2024

(51) Int. Cl.
*G06F 1/32* (2019.01)
*G06F 1/3203* (2019.01)

(52) U.S. Cl.
CPC .................................. *G06F 1/3203* (2013.01)

(58) Field of Classification Search
CPC .................................................... G06F 1/3203
See application file for complete search history.

(56) References Cited

U.S. PATENT DOCUMENTS

2016/0342166 A1* 11/2016 Rodriguez ............... G05F 1/56
2022/0163576 A1   5/2022 Xu et al.

OTHER PUBLICATIONS

Lüders, et al, "Fully-integrated LDO voltage regulator for digital circuits," Advances in Radio Science, Adv. Radio Sci., 9, 263-267, www.adv-radio-sci.net/9/263/2011/, doi:10.5194/ars-9-263-2011, 2011, 5 Pages.
Videocardz.com, "More details about AMD Zen CPU core revealed at ISSCC," https://videocardz.com/65774/more-details-about-amd-zen-cpu-core-revealed-at-isscc, Published Feb. 9, 2017, downloaded Aug. 23, 2022, 17 Pages.

* cited by examiner

*Primary Examiner* — Stefan Stoynov
(74) *Attorney, Agent, or Firm* — Berkeley Law & Technology Group, LLP

(57) ABSTRACT

Briefly, embodiments, such as methods, systems and/or circuits for controlling a power signal to be supplied to a processing device. In one aspect, a magnitude of a power supplied to a processing device may be changed based, at least in part on an estimated and/or predicted load.

14 Claims, 15 Drawing Sheets

SYSTEM, METHOD AND/OR APPARATUS FOR CONTROLLING A POWER SIGNAL

BACKGROUND

1. Field

This disclosure relates to techniques for controlling power to be provided to processing devices.

2. Information

Processor devices typically have dynamic power requirements based on a processing demand at any given time. Processor devices typically include circuitry to adaptively increase or decrease power of a signal to be applied to a processing device to respond to dynamic computing conditions.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
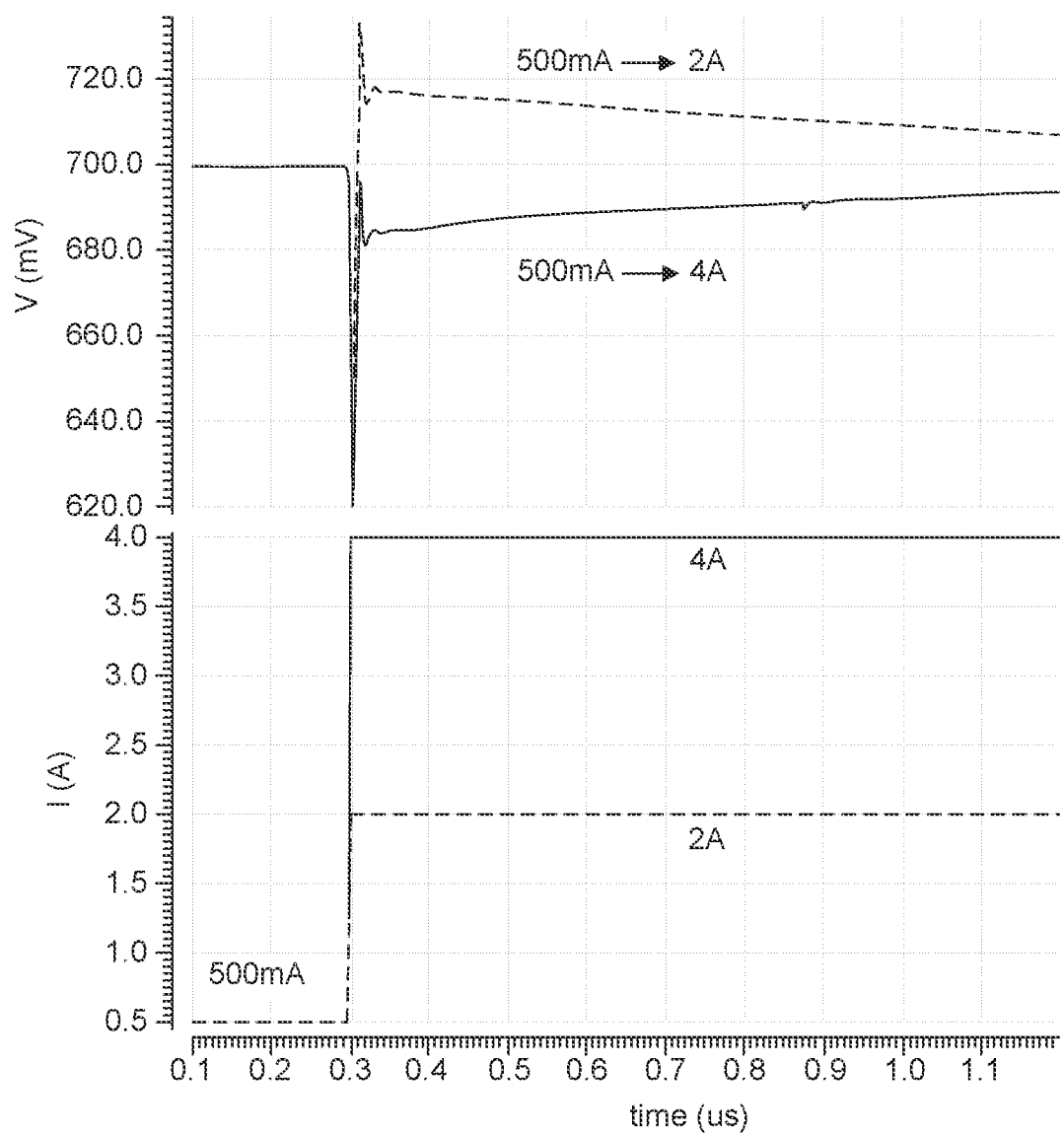
FIG. 1 includes plots of an output voltage applied to a processor circuit responsive to a change in a current load, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

According to an embodiment of a processor circuit, a digital low-dropout regulator (LDO) in combination with a proportional-integral (PI) control may be used to control power supplied to the processor circuit responsive to dynamic changes in a power load. In some implementations, such a digital LDO with a PI control to control power supplied at an output terminal may tend to have poor transient responses due to an output impedance of such a circuit. One technique to improve such transient responses employs a fast droop detection circuit that establishes a fixed voltage threshold. If an output voltage drops below the fixed voltage threshold, a fixed number of power headers may be activated or coupled to an output terminal to make up for the detected droop. This technique, however, suffers from a drawback of an inevitable delay from a load step event to voltage detection. Additionally, a current strength of the fixed number of headers added to address a droop may not accurately approach a device load at an instance. As such, and as shown in FIG. 1, an undesired overshoot may result if a current strength of such a fixed number of headers far exceeds an instant load.

Briefly, in one particular implementation, a processor load and/or change in the processor load of a processing device may be estimated and/or predicted based, at least in part, on the estimated and/or predicted processor load, a magnitude of power supplied to the processing device may be changed. By adjusting power supplied to a processing device responsive to an estimated and/or predicted current load, poor transient performance (e.g., from changing power signal responsive to a voltage drop) may be avoided.

Figure 2:
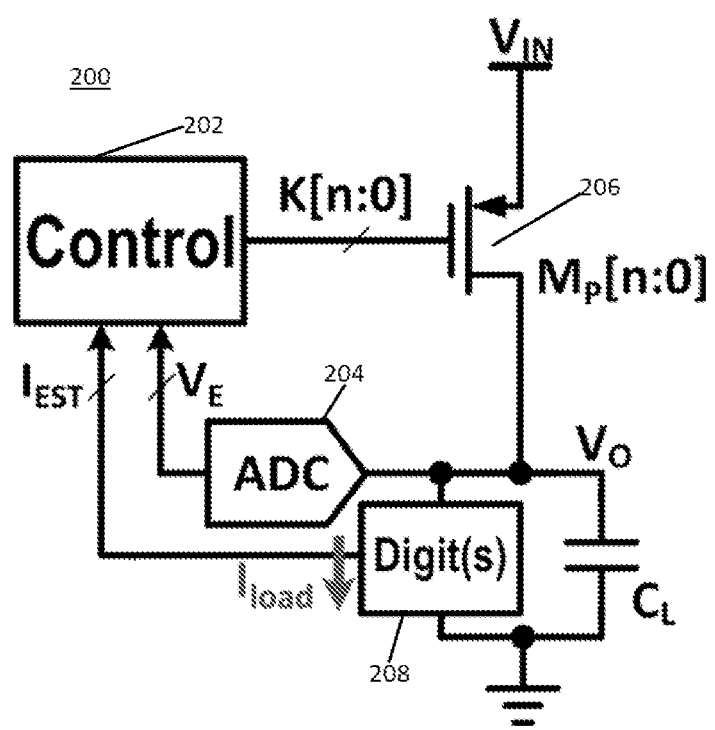
FIG. 2 is a schematic diagram of a circuit to control a power signal provided to a processor circuit, according to an embodiment.

In one aspect, as illustrated by circuit 200 shown in FIG. 2, a power signal provided to a processing device 208 may be controlled responsive to signal K[n:0] provided control circuit 202 and applied to a gate terminal of field effect transistor(s) (FET(s)) 206. In particular implementations, processing device may comprise a central processing unit (CPU), graphics processing unit (GPU) and/or neural processing unit (NPU), just to mention a few examples of a processing device that may be powered by a power signal. According to an embodiment, a number of FETs 206 may be switched on in parallel to connect $V_{IN}$ to vary a voltage drop to provide $V_0$ based, at least in part, on value for signal K[n:0]. Control circuit 202 may control a level, value and/or magnitude of signal K[n:0] based on and/or responsive to an estimated and/or predicted current load $I_{EST}$ and/or a voltage error $V_E$ sampled at ADC 204. In a particular implementation, voltage error $V_E$ may be determined based, at least in part, a reference voltage and voltage $V_o$, for example. $I_{EST}$ may comprise an estimated and/or predicted processor load for a processor circuit which may change responsive to dynamic conditions of the processing circuit (e.g., current and/or predicted processing tasks). As referred to herein, "processor load" means a quantity of current to be delivered in a power to a processor device to maintain a target voltage at a device terminal. In a particular implementation, a level, value and/or magnitude of K[n:0] may be determined and/or controlled to be at or about a value that matches a processor load. $I_{EST}$ may be determined based, at least in part, on observations obtained from a power monitor (not shown) such as an on-chip power monitor (OPM) described herein with reference to FIGS. 8 through 15.

Figure 3:
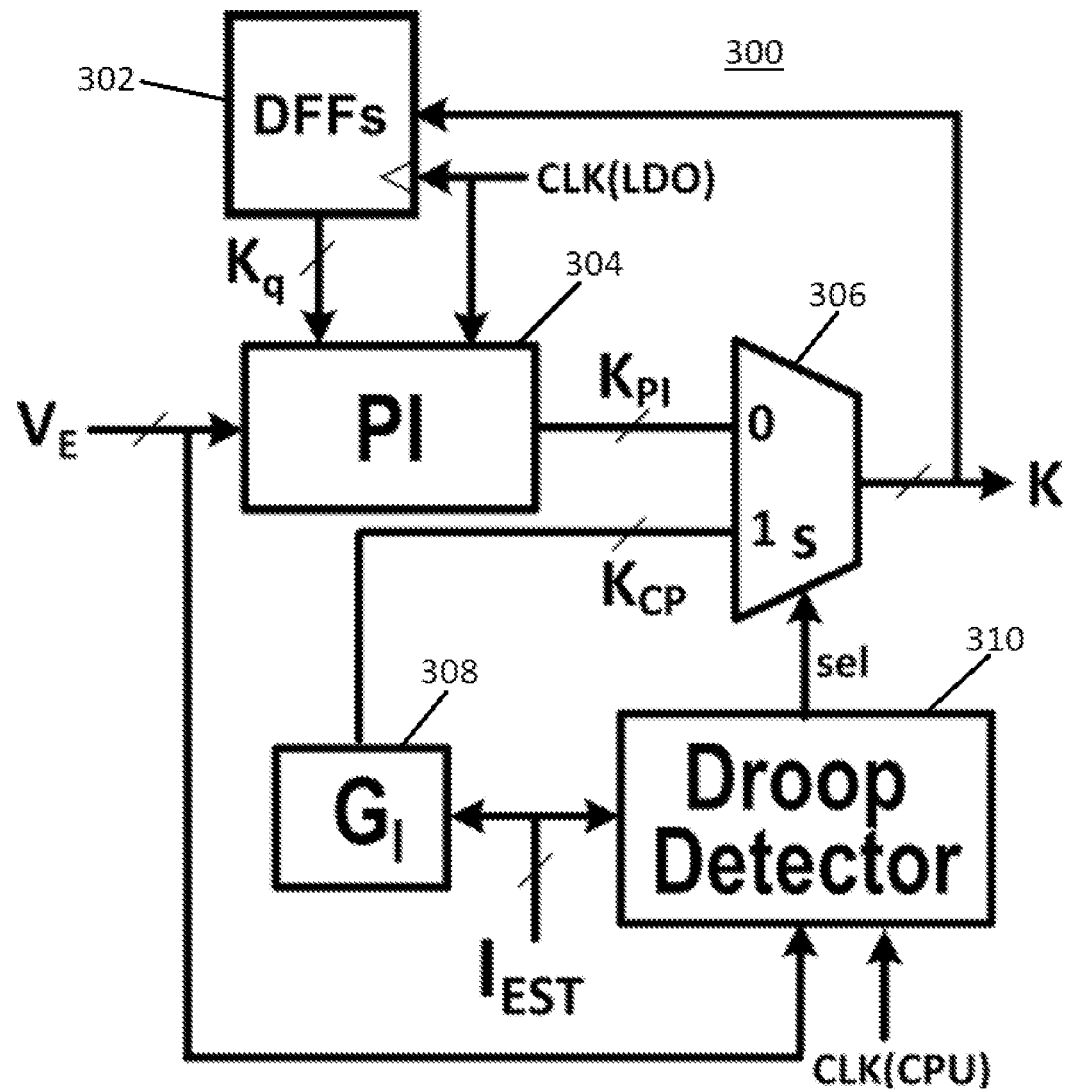
FIG. 3 is a schematic diagram of a circuit to control a power signal provided to a processor circuit, according to an embodiment.

According to an embodiment, features of control circuit 202 may be implemented, at least in part, according to features of circuit 300 shown in FIG. 3 where output signal K[n:0] of control circuit 202 may be provided as an output signal K of multiplexer 306. In an implementation, output signal K may be generated from a control loop including an LDO clock signal CLK(LDO) comprising multiplexer 306, D-flip flop 302 to store a most recent output signal K, and PI circuit 304 to compute a value of control signal $K_{PI}$ based, at least in part, a previous output signal K stored as $K_q$ stored in D-flip flop 302 and $V_E$. In a particular implementation, PI circuit 304 may comprise circuitry to implement a proportional-integral-derivative controller, for example.

According to an embodiment, output signal K may be selected at multiplexer circuit 306 as a value of control signal $K_{PI}$ (output of PI circuit 304) or a value control signal $K_{CP}$ computed based on a gain $G_I$ applied to estimated and/or predicted current load $I_{EST}$ based, at least in part, on selection signal sel from droop detector circuit 310. Droop detector circuit 310 may determine a state of selection signal sel to be applied to multiplexer 306 at least in part according to process 400 shown in FIG. 4. In an embodiment, if a droop is detected, signal sel may be set HIGH (e.g., sel=1) and multiplexer 306 may provide an output as control signal $K_{CP}$. Otherwise, multiplexer 306 may provide an output as control signal $K_{PI}$.

Figure 4:
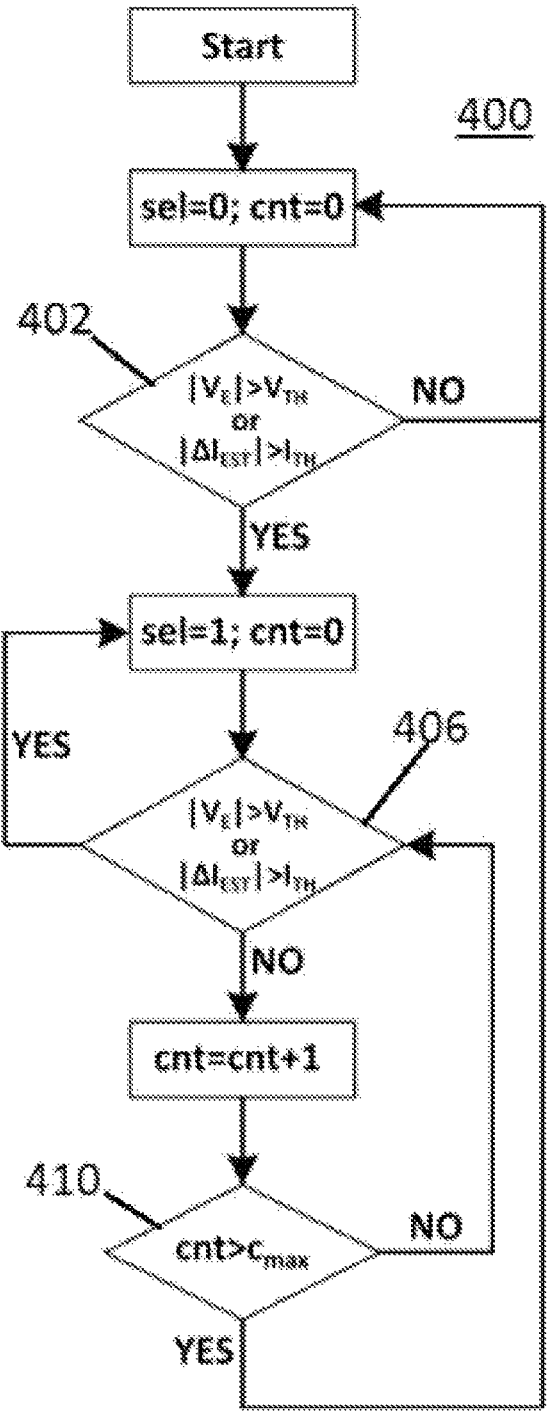
FIG. 4 is a flow diagram of a process to determine whether a power signal provided to a processor circuit is to be changed, according to an embodiment.

As shown in FIG. 4, a state of selection signal sel may be determined based, at least in part, on changes in an estimated and/or predicted current load, $\Delta I_{EST}$, and/or a magnitude of voltage error $V_E$. As shown, diamond 402 or 406 may set a state of selection signal sel to "1" if $|V_E|>V_{TH}$ or $|\Delta I_{EST}|>I_{TH}$, where $V_{TH}$ and $I_{TH}$ are threshold voltage and current, respectively, and $\Delta I_{EST}$ may be determined according to expression (1) as follows:

$$\Delta I_{EST}=I_{EST}[n]-I_{EST}[n-1] \quad (1)$$

where:
$I_{EST}[n]$ is an estimated and/or predicted current load in a period n; and
$I_{EST}[n-1]$ is an estimated and/or predicted current load in a period n−1.

According to an embodiment, droop detector circuit 310 may sample values of $I_{EST}$ and $V_E$ periodically on cycles of processor clock signal CLK(CPU). It should be understood, however, that timing of droop detector circuit 310 may be controlled by a different clock source. As such, a value for $\Delta I_{EST}$ may be computed according to expression (1) for values of $I_{EST}$ computed for two successive clock cycles, n and n−1, or other time periods (e.g., groups of clock cycles). In the particular implementation of circuit 300, a control loop formed by multiplexer 306, D-flip flop 302 and PI circuit 304 may be controlled to update output signal K on cycles of an LDO clock signal CLK(LDO) while droop detector circuit 310 may be controlled by processor clock signal CLK(CPU). To synchronize droop detector circuit 310 and control loop formed by multiplexer 306, D-flip flop 302 and PI circuit 304, process 400 may increment a counter cnt between diamonds 406 and 410 so that a value for sel may not be reset to zero until sel is maintained for $c_{max}$ cycles of processor clock signal CLK(CPU).

Figure 5:
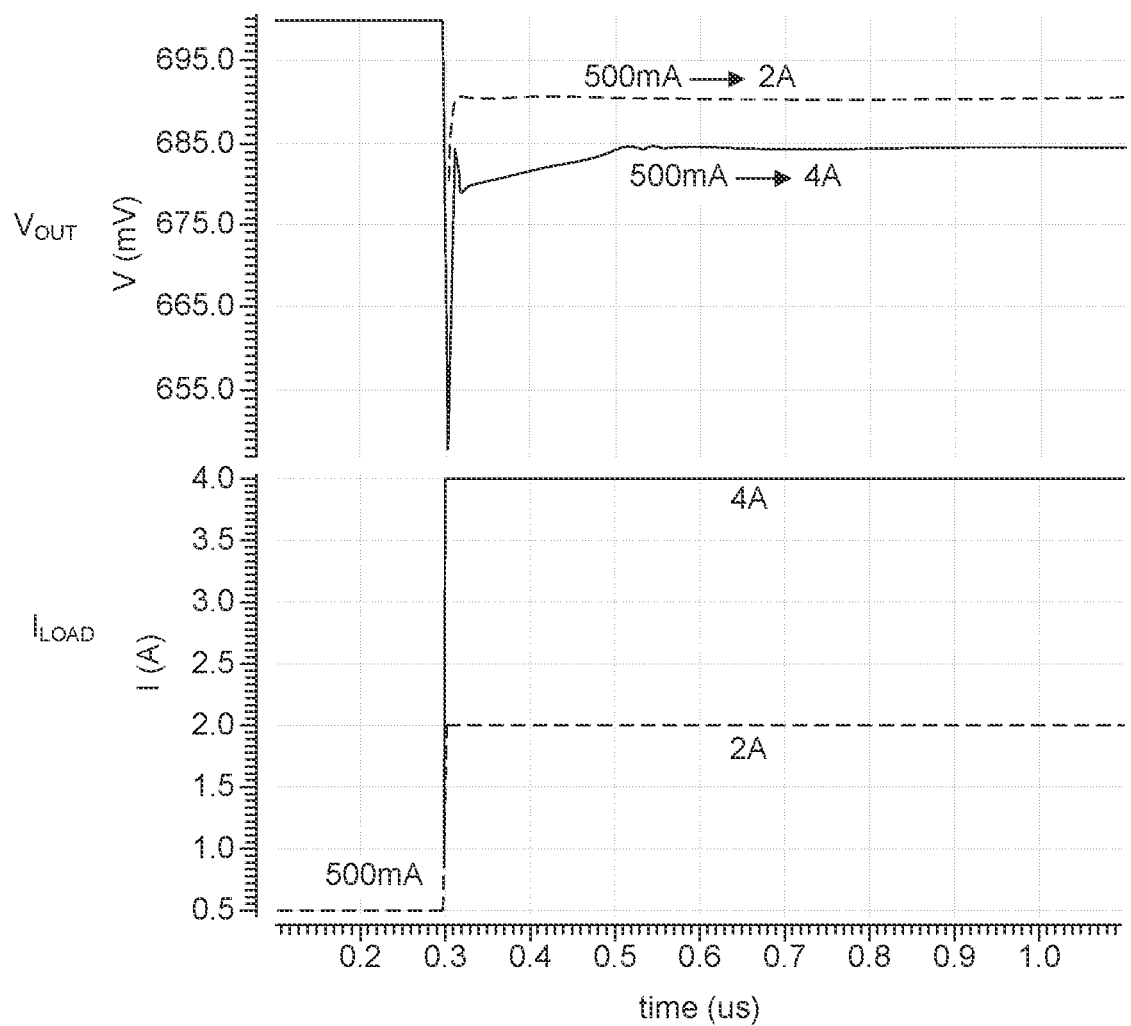
FIG. 5 includes plots of voltage and current load applied to a processor circuit responsive to a change in a power signal, according to an embodiment.
Figure 6A:
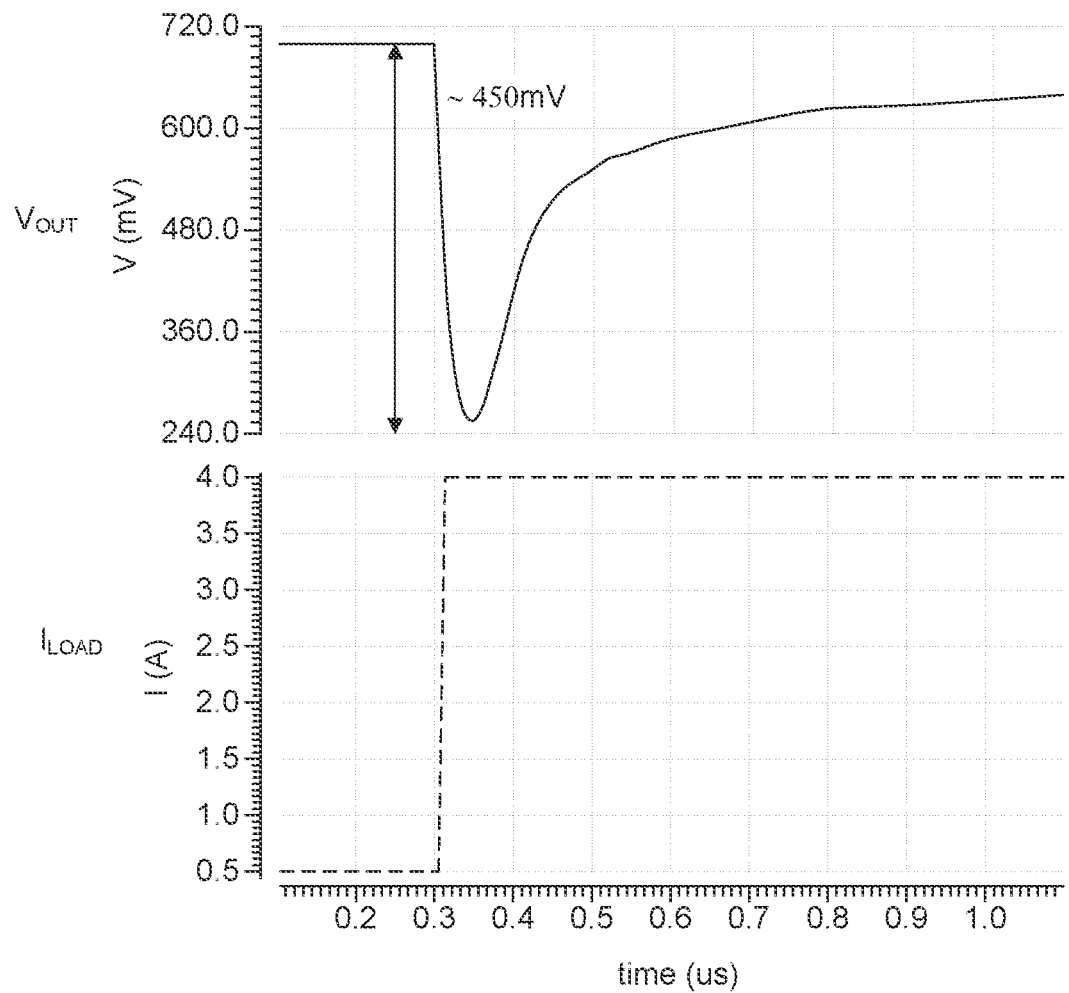
FIGS. 6A and 6B are plots showing transient responses of a processor circuit to changes in an applied power signal according to embodiments.
Figure 6B:
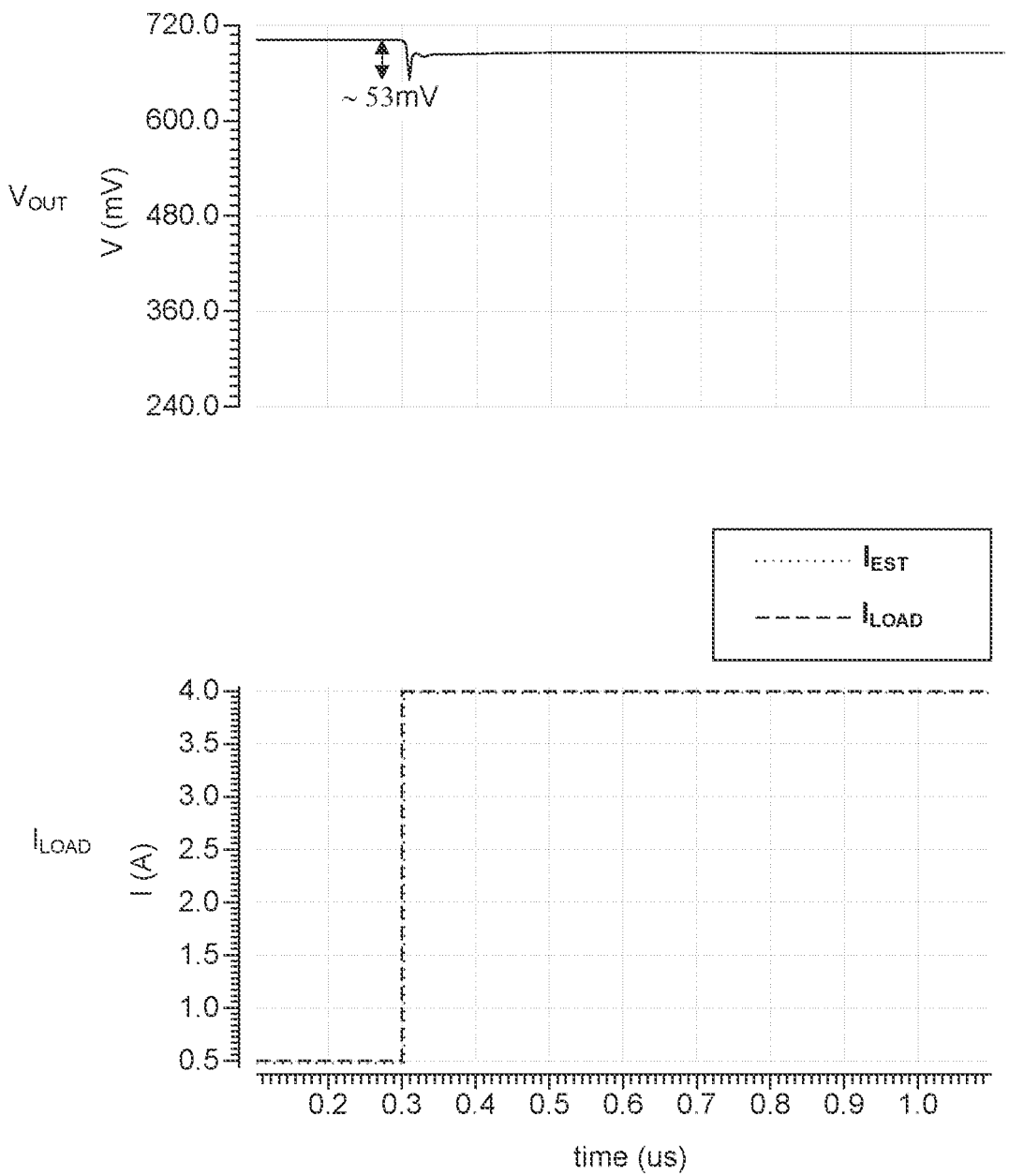
Figure 7:
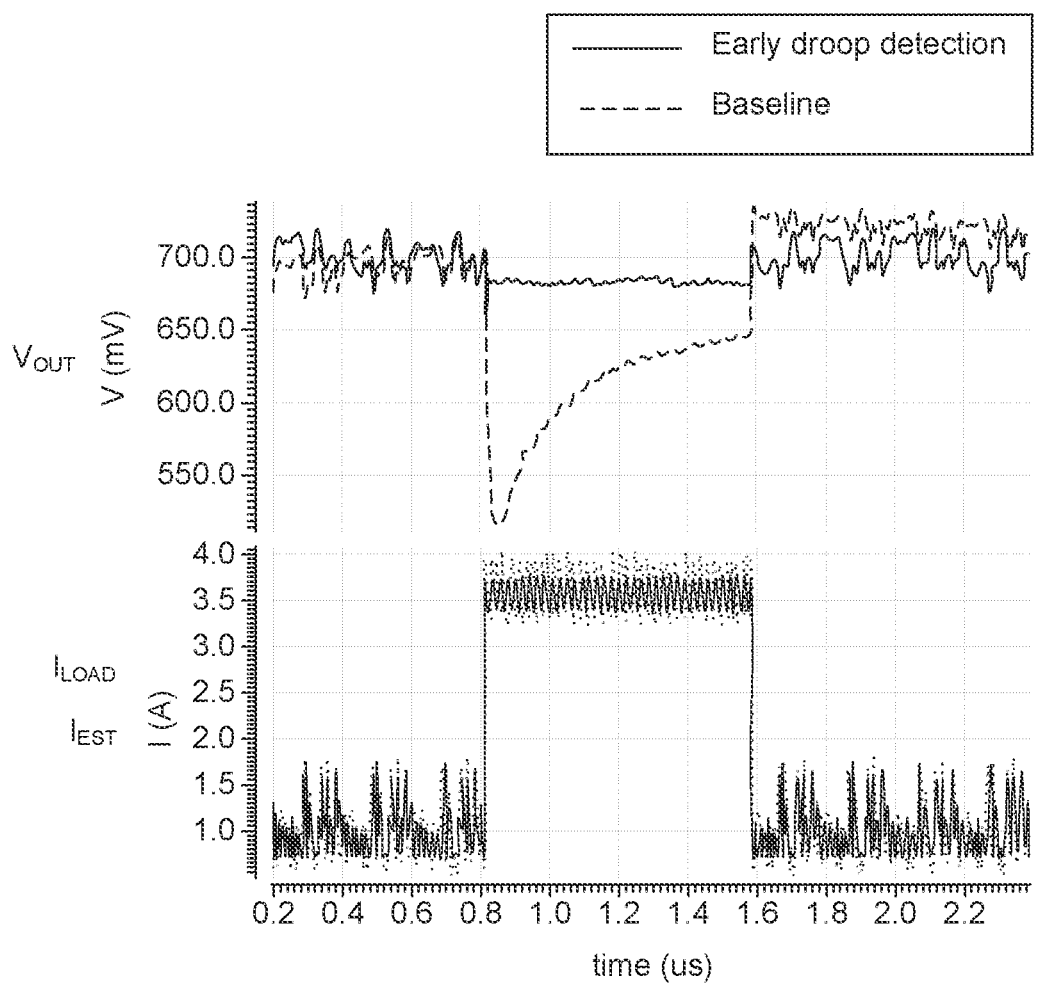
FIG. 7 is a plot of transient responses to changes in a power signal, according to an embodiment.

FIG. 5 includes plots of transient responses for control of a power signal (e.g., determination of a number of headers to be applied) responsive to early droop detection implemented according to circuits 200 and 300 shown in FIGS. 2 and 3. Here, transients responsive to different load steps from 500 mA to 2.0 A and 4.0 A are shown with very short output voltage transients with no voltage overshoot as control signal $K_{CP}$ may be determined based, at least in part, on an estimated and/or predicted current load $I_{EST}$. FIG. 6A shows plots of a load step from 500 mA to 4.0 A and a corresponding output voltage drop of −450 mV occurring without early detection. In the particular implementation of FIG. 6B, a current load $I_{LOAD}$ may be estimated and/or predicted as $I_{EST}$ and provided as an input signal to an early droop detection circuit (e.g., circuit 300) to result in a significantly smaller output voltage drop of −53 mV. Plots of FIG. 7 show a comparison of transient responses of a system without early droop detection and using an estimated and/or predicted current load.

According to an embodiment, a current load at a power input to a processor $I_{LOAD}$ may be predicted and/or estimated as $I_{EST}$ based, at least in part, on observations obtained from an on-chip power meter (OPM) using a set of power proxies and corresponding coefficients. Identification of the power proxies and coefficients may be based on signal and power parameters from an automated power modelling methodology. An OPM may be configurable in terms of a number of power proxies, coefficient values, bit quantization of coefficient values, and power measurement window size.

In one embodiment, OPM for per-cycle power monitoring may be implemented using 1-bit counters, AND gates and adders, without using multipliers. An OPM for multicycle average power monitoring may be implemented by cascading a per-cycle OPM implementation, a shifter, and an adder. Alternatively, an OPM for multi-cycle average power monitoring may be implemented using multi-bit counters, multipliers and adders.

Figure 8:
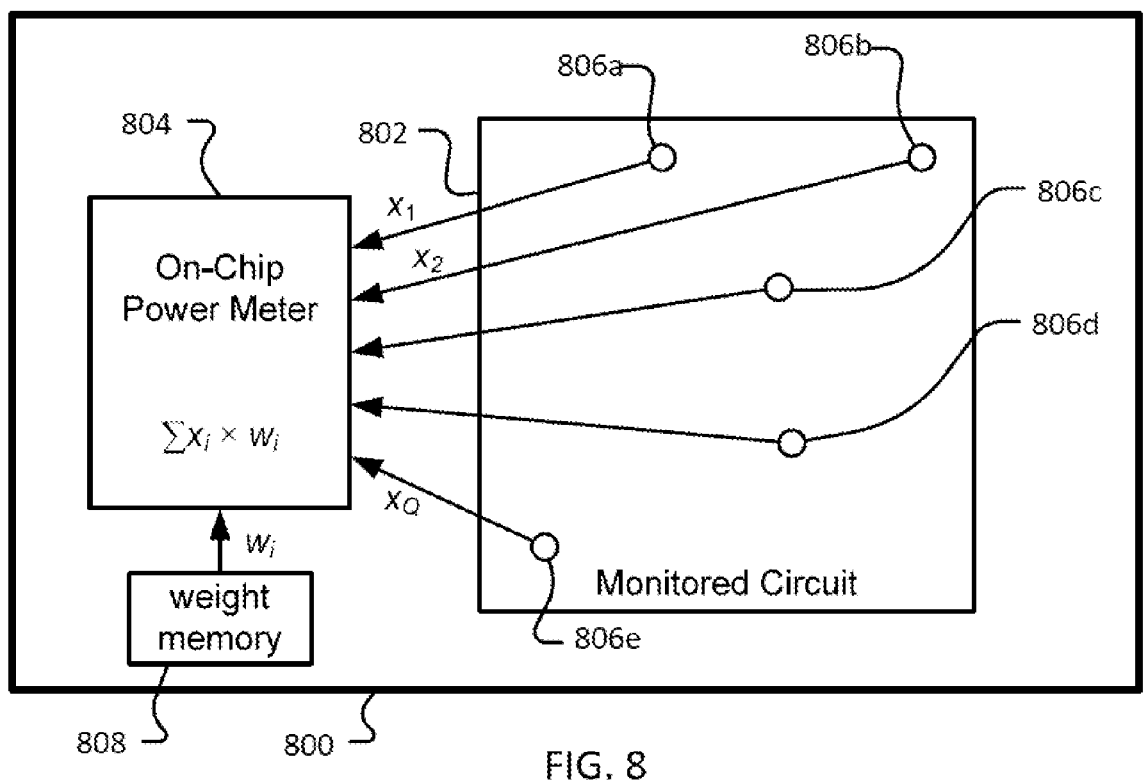
FIG. 8 is a schematic diagram of an on-chip power meter (OPM), according to an embodiment.

FIG. 8 is a diagrammatic representation of an integrated circuit (IC) including an OPM in accordance with embodiments of the disclosure. A chip and/or IC 800 may include a monitored circuit 802 and a power meter circuit 804. Power meter circuit 104 may receive signals from primary circuit 802 at circuit locations 106a-106e. Toggle parameters $\{x_i\}$ may be derived from such sequences. OPM 804 may be configured to produce a power P in each clock cycle as a weighted sum of the toggle parameters $\{x_i\}$ using corresponding weights and/or coefficients $w_i$. Power and/or load may be estimated and/or predicted from parameters derived a set of proxy signals, referred to as power proxies. In one embodiment power may be estimated and/or predicted from toggling activities of a set of proxy signals. In a further embodiment, power and/or load may be estimated and/or predicted from signal levels of the proxy signals, which contain similar features. It may be apparent to those of ordinary skill in the art that parameters derived from the proxy signals in other ways may be combined to estimate and/or predict power and/or load in the primary circuit. Herein, the terms "toggle parameters" shall refer to any parameters derived from proxy signals and, in particular, shall include both signal transition parameters (where, for example, "1" denotes a signal change in a clock cycle and "0" denotes no change) and signal level parameters (where, for example, "1" denotes a first signal level and "0" denotes a second signal level).

In the example shown in FIG. 8, a power meter may use a linear model with Q power proxies for power prediction, e.g., $P=\sum_{i=1}^{Q} w_i * x_i$. An input vector for each clock cycle may consist of the toggling activities of Q power proxies, which may be encoded as a binary vector. This means, for the runtime power prediction, instead of using multipliers, a proposed OPM for per-cycle power tracing may be implemented with AND gates and adders.

Figure 9:
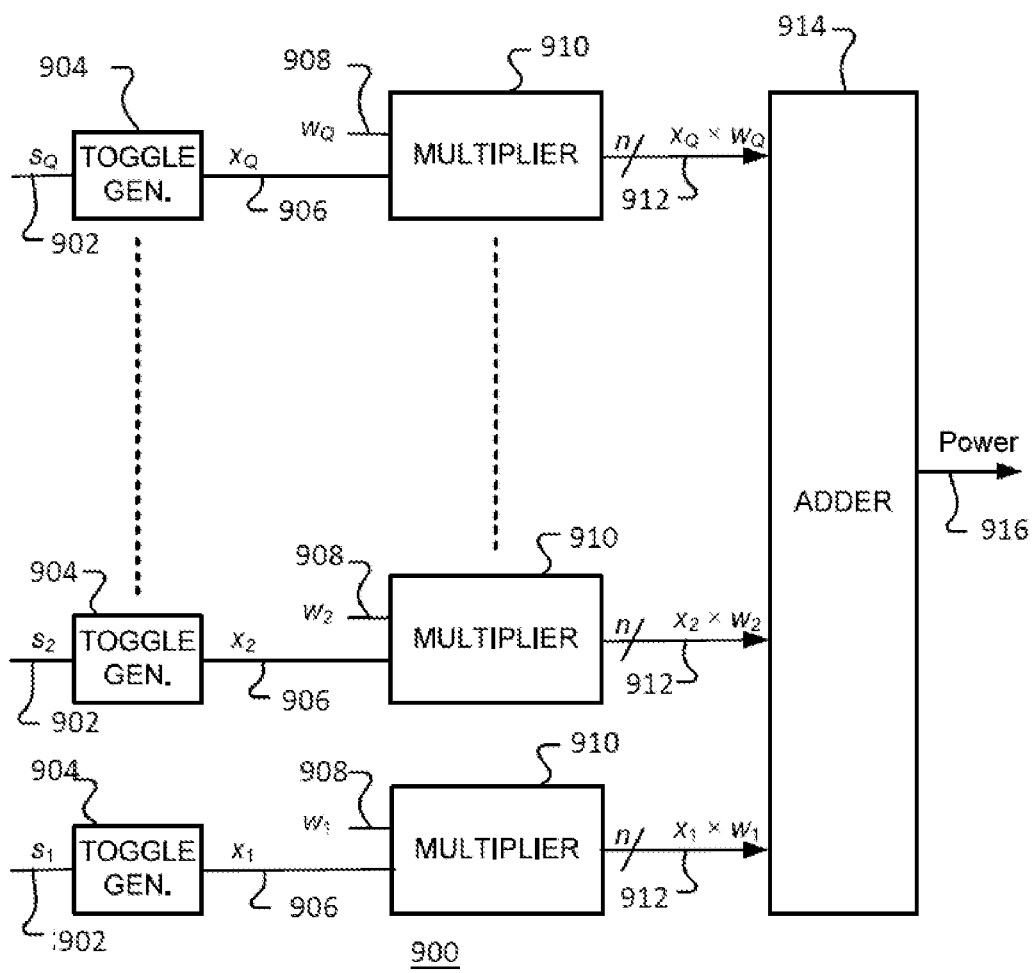
FIGS. 9 through 11 are schematic diagrams of features of an OPM, according to particular embodiments.

FIG. 9 is a block diagram of a power meter 900 in accordance with embodiment of the disclosure. In FIG. 9, logic signals $\{s_i\}$ (902) are provided to toggle generators 904 to produce toggle parameters, $\{x_i\}$ (906). Toggle parameters, $\{x_i\}$ may be combined with weight values $w_i$ (908) in multipliers 910. Multi-bit outputs 912 from multipliers 910 may be combined in adder 914 to provide the power estimate and/or prediction $P_k$ (916) in each clock cycle k.

Figure 10:
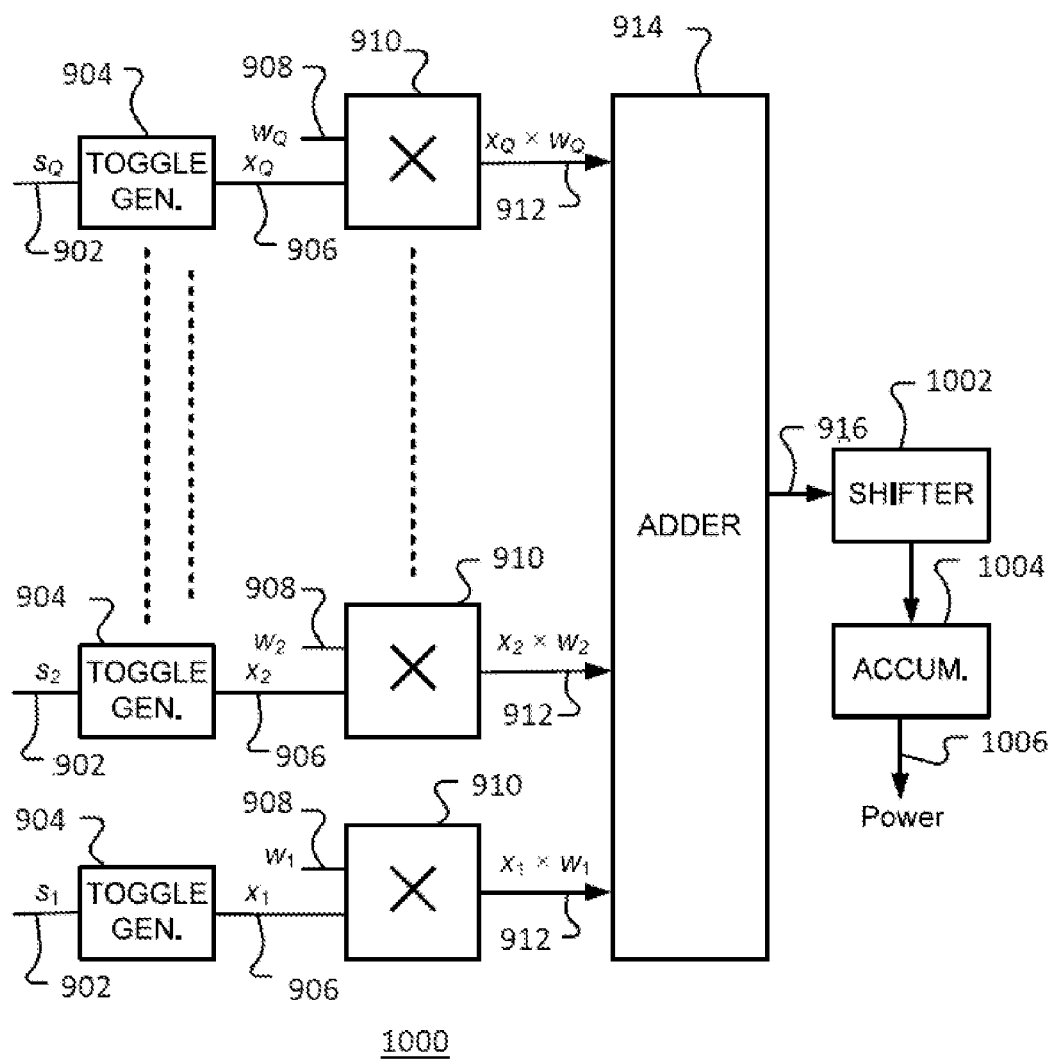
Figure 11:
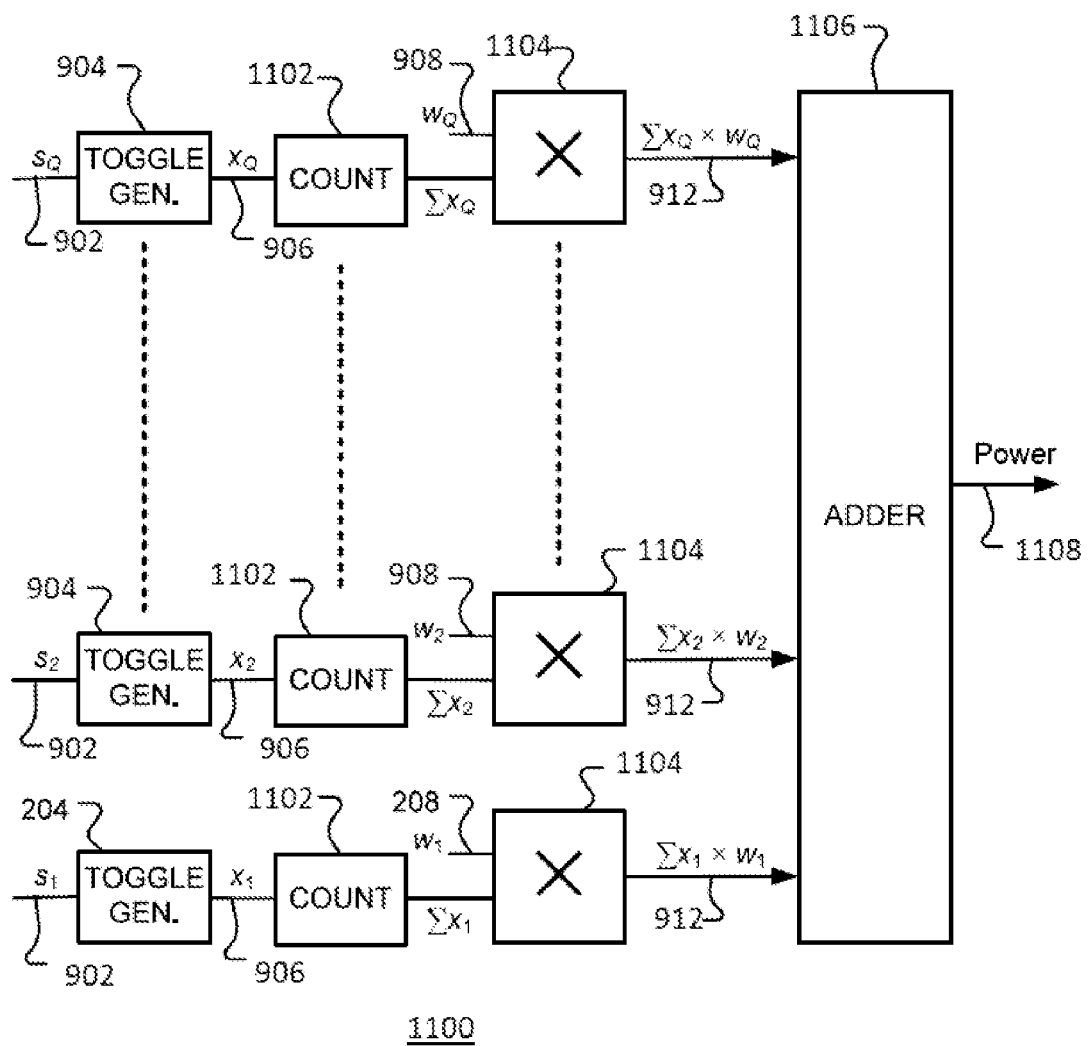

FIG. 10 shows an extension of the per-cycle OPM implementation 1000, discussed above, to the measurement of power averaged over two cycles, in accordance with embodiments of the disclosure. In OPM 1000 shown in FIG. 10, power estimates and/or predictions $P_k$ (1016) may be divided by a factor $2^m$ in bit shifter 1002 and then accumulated over two cycles in adder 1004 to produce the average power 1006. In a further implementation, the steps of dividing and accumulating are reversed. FIG. 11 is a block diagram of a further implementation of an OPM 1100 for the average power monitoring over 2 cycles. In FIG. 11, logic signals $\{s_i\}$ (1102) are input to toggle generators 904 to produce toggle parameters $\{x_i\}$ (906). Toggle parameters may be input to m-bit counters 1102 to produce aggregated toggle parameters. The use of 2-bit counters may enable a total number of toggles, $x_j$, to be counted for each signal. These values are multiplied by corresponding weights $\{w_i\}$ using multipliers 1104. After adding the contributions 912 from each signal together in adder 1106, the average power can be achieved using a right-shift operation as described above.

FIG. 10 shows an extension of the per-cycle OPM implementation 1000, discussed above, to the measurement of power averaged over two cycles, in accordance with embodiments of the disclosure. In OPM 1000 shown in FIG. 10, the power estimates and/or predictions $P_k$ (1016) may be divided by a factor $2^m$ in bit shifter 1002 and then accumulated over two cycles in adder 1004 to produce the average power 1006. In a further implementation, the steps of dividing and accumulating are reversed. FIG. 11 is a block diagram of a further implementation of an OPM 1100 for average power monitoring over two cycles. In FIG. 11, logic signals $\{s_i\}$ (1102) are input to toggle generators 904 to produce toggle parameters $\{x_i\}$ (906). Toggle parameters may be provided to m-bit counters 1102 to produce aggregated toggle parameters. Use of 2-bit counters may enable a total number of toggles, $x_j$, to be counted for each signal. These values are multiplied by corresponding weights $\{w_i\}$ using multipliers 1104. After adding contributions 912 from each signal together in adder 1106, an average power may be computed using a right-shift operation as described above.

FIG. 10 shows an extension of the per-cycle OPM implementation 1000, discussed above, to the measurement of power averaged over two cycles, in accordance with embodiments of the disclosure. In OPM 1000 shown in FIG. 10, the power estimates and/or predictions $P_k$ (1016) may be divided by a factor $2^m$ in bit shifter 1002 and then accumulated over two cycles in adder 1004 to produce the average power 1006. In a further implementation, the steps of dividing and accumulating are reversed. FIG. 11 is a block diagram of a further implementation of an OPM 1100 for average power monitoring over two cycles. In FIG. 11, logic signals $\{s_i\}$ (1102) are input to toggle generators 904 to produce toggle parameters $\{x_i\}$ (906). Toggle parameters may be provided to m-bit counters 1102 to produce aggregated toggle parameters. Use of 2-bit counters may enable a total number of toggles, $x_j$, to be counted for each signal. These values are multiplied by corresponding weights $\{w_i\}$ using multipliers 1104. After adding contributions 912 from each signal together in adder 1106, an average power may be computed using a right-shift operation as described above.

FIG. 10 shows an extension of the per-cycle OPM implementation 1000, discussed above, to the measurement of power averaged over two cycles, in accordance with embodiments of the disclosure. In OPM 1000 shown in FIG. 10, the power estimates and/or predictions $P_k$ (1016) may be divided by a factor $2^m$ in bit shifter 1002 and then accumulated over two cycles in adder 1004 to produce the average power 1006. In a further implementation, the steps of dividing and accumulating are reversed. FIG. 11 is a block diagram of a further implementation of an OPM 1100 for average power monitoring over two cycles. In FIG. 11, logic signals $\{s_i\}$ (1102) are input to toggle generators 904 to produce toggle parameters $\{x_i\}$ (906). Toggle parameters may be provided to m-bit counters 1102 to produce aggregated toggle parameters. Use of 2-bit counters may enable a total number of toggles, $x_j$, to be counted for each signal. These values are multiplied by corresponding weights $\{w_i\}$ using multipliers 1104. After adding contributions 912 from each signal together in adder 1106, an average power may be computed using a right-shift operation as described above.

Figure 12:
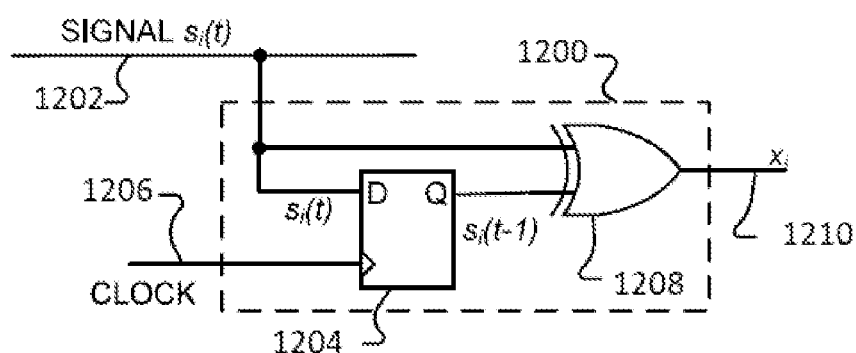
FIGS. 12 and 13 are schematic diagrams of features of a toggle generator, according to particular embodiments.
Figure 13:
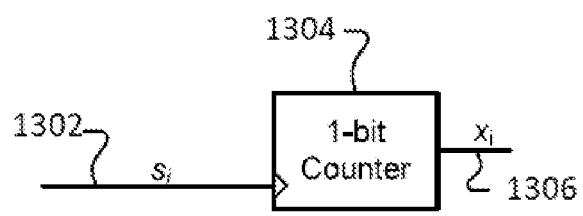

In particular embodiments, an OPM may be implemented in a variety of circuits, including but not limited to, central processing units (CPUs), graphics processing unit (GPUs), neural processing units (NPUs) and system interconnects. FIG. 12 shows an example embodiment of a toggle generator 1200. A logic signal $s_i(t)$ (1202) at time t is passed the parameters input of register 1204 clocked by clock signal 1206. The register may be D flip-flop, for example. The output from register 1204, which corresponds to the previous input signal, $s_i(t-1)$, is combined in logic XOR ('exclusive or') gate 1208 to produce toggle parameters $\{x_i\}$ (1210). FIG. 13 shows a further embodiment of a toggle generator 1300, in which input logic signal 1302 ($s_i$) is passed to a 1-bit counter 1304 to provide toggle parameters 1306.

Figure 14:
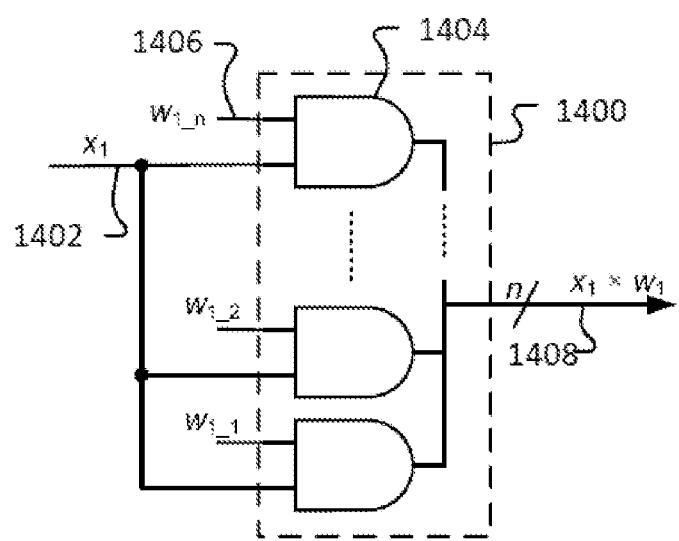
FIG. 14 is a schematic diagram of a multiplexer, according to an embodiment.

FIG. 14 shows an embodiment in which a multiplier (910 in FIG. 9) may be implemented as a multi-bit AND gate 1400. In this multiplier embodiment of the multiplier, toggle parameters 1402 may be passed to each single-bit AND gate 1404 to be combined with one bit of weight value w1. In the example shown, weight value w1 has n bits denoted as $w_{1\_1}$, $w_{1\_2}, \ldots, w_{1\_n}$. Since the values of $\{x_i\}$ are either '1' or '0', logical AND operation is equivalent to a multiplication and the n-bit output 1408 is equal to the product of the toggle value and the weight value.

Figure 15:
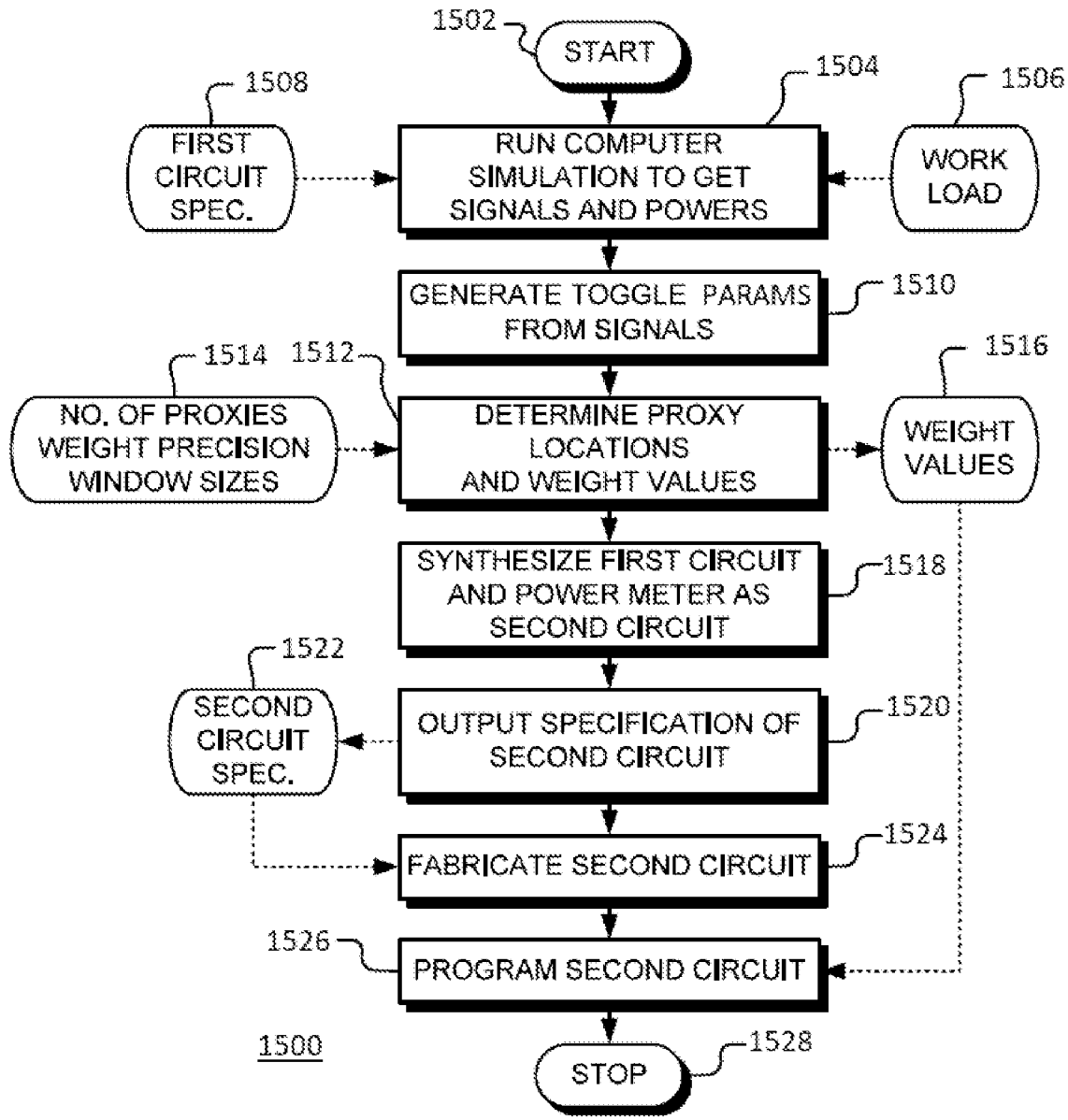
FIG. 15 is a flow diagram of a process for design of an OPM, according to an embodiment.

FIG. 15 is a flow diagram of a process 1500 for automated design and synthesis of a power meter, in accordance with various representative embodiments. Following start block 1502, a computer readable specification of a first electronic circuit may be processed in a computer simulation at block 1504 to determine signals at a set of circuit locations in the first electronic circuit and corresponding electrical power usage in the first electronic circuit in a number of time windows. The simulation determines signals and powers generated by executing a designated workload 1506 in a first circuit specified by specification 1508. From the signals, toggle parameters corresponding to transitions in the determined signals in the number of time windows is generated at block 1510. In an alternative embodiment, other signal traces, such as signal levels, may be generated at block 1510.

From toggle parameters and corresponding electrical power usage, a number of proxy locations may be selected automatically at block 1512. A number of proxy locations 1514 may be designated by a user. At the same time, corresponding weight values 1516 are determined. Proxy locations may comprise a subset of circuit locations for which signals at the subset of circuit locations are indicative of a present and/or expected electrical power usage in the first electronic circuit. From the computer readable specification of first electronic circuit and proxy locations, a second electronic circuit may be synthesized at block 1518, and output at block 1520 to second circuit specification 1522. The second circuit may include both the first electronic circuit and a power meter circuit. The power meter circuit may be configured to receive signals from the proxy locations of the first electronic circuit and produce a measurement of power usage in the first electronic circuit.

The second circuit may be fabricated at block 1524 based on the specification 1522. Finally, the weight values of the power meter circuit may be programmed at block 1526. The method terminates at block 1528.

Proxy locations may be selected automatically and, at the same time, corresponding weight values are determined. An estimated and/or predicted electrical power usage in the first electronic circuit may be produced in the power meter circuit from a sum of the toggle parameters at the proxy locations weighted by the weight values. eight values may be determined to a designated number of bits.

A power meter circuit may be configured to determine the electrical powers in the first electronic circuit as a function of the sum of the toggle parameters for the proxy locations weighted by the weight values.

In one embodiment, weight values are determined for estimating and/or predicting electrical powers in the first electronic circuit from the toggle parameters at a first set of circuit locations. Proxy locations may then be selected as circuit locations are weighted by a non-zero value. A duration of time windows may be designated by a user, for example.

A further embodiment of the disclosure provides an integrated circuit that includes a first circuit having a number of circuit locations and a power meter circuit. Such a power meter circuit may be operationally coupled to the first circuit at proxy locations, where the proxy locations are a subset of the plurality of circuit locations. The power meter circuit includes toggle parameters generator circuitry for receiving signals from the proxy locations of the first circuit and generating toggle parameters therefrom and combiner circuitry for combining the toggle parameters in a first time window with a set of weight value to produce a measure of power usage in the first circuit as output. The time window includes a number of clock cycles of the first circuit.

The power meter also includes storage for toggle parameters in the first time window and storage for the set of weight values. The combiner circuitry includes a number of multipliers, one for each proxy location and an adder. Each multiplier multiplies toggle parameters for a proxy location by a corresponding weight value to produce weighted toggle parameters. The adder is configured to sum the weighted toggle parameters to produce the measure of power usage in the first circuit.

Toggle parameters may take the form of a logic signal for each proxy location. In this case, a multiplier may include, for each proxy location and each bit of a corresponding weight value, a logic gate configured to perform a logical 'AND' operation between toggle parameters for the proxy location and a bit of the corresponding weight value.

In one embodiment, toggle parameter generator circuitry may include a register for storing a prior signal for a proxy location and a logic gate configured to perform a logical 'exclusive or' ('XOR') operation between the prior signal for the proxy location and a current signal for the proxy location to produce toggle parameters as output. In a further embodiment, toggle parameter generator circuitry includes a one-bit counter responsive to a signal from a proxy location and producing toggle parameters as output. Combiner circuitry may be configured to aggregate toggle parameters over a second time window having a shorter duration than the first time window. In this case, the measure of power usage in the first circuit is a weighted sum of the aggregated toggle parameters.

Combiner circuitry may be configured to aggregate a weighted sum of toggle parameters over a second time window having a shorter duration than the first time window. In this case, the measure of power usage in the first circuit is based on the aggregated weighted sum of toggle parameters. The second time window may include 2N clock cycles, in which case the combiner may include a shifter configured to produce an average of weighted sum of the toggle parameters by shifting the aggregated weighted sum of the toggle parameters by N binary places.

A further embodiment of the disclosure relates to a method for power measurement in a first circuit of an integrated circuit using a power meter circuit in the integrated circuit. The method includes receiving signals from a number of proxy locations in the first circuit for multiple clock cycles of the first circuit in one or more first time windows. Toggle parameters may be produced for proxy locations for clock cycles in the one or more first time windows. For one or more first time windows, toggle parameters from the proxy locations and the plurality of clock cycles are combined based on a set of weight values to provide a power usage signal for the first circuit. The proxy locations are a subset of locations in the first circuit.

The one or more first time windows may be overlapping time windows and combining the toggle parameters may include forming a sum of the toggle parameters weighted by set of weight values. In one embodiment, the toggle parameters for each proxy location may be averaged over clock cycles of a second time window to provide averaged toggle parameters. Power usage may then be produced by forming a weighted sum of averaged toggle parameters using the set of weight values.

According to an embodiment, circuit 200, circuit 300, process 400 and/or features shown in FIGS. 8-14 may be formed by, implemented in and/or expressed in transistors and/or lower metal interconnects (not shown) in processes (e.g., front end-of-line and/or back-end-of-line processes) such as processes to form complementary metal oxide semiconductor (CMOS) circuitry, just as an example. For example, circuit 200, circuit 300, process 400 and/or features shown in FIGS. 8-14 may be formed by, implemented in and/or expressed in transistors and/or lower metal interconnects in processes to form an integrated circuit (IC) die in CMOS circuitry. Such an IC die may include a processing circuit configurable to execute computer-readable instructions that is to receive a controllable power signal as discussed above. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed herein.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
predicting a load of a processing device and/or change in the load of the processing device based, at least in part, on a sum of digital proxy signals obtained from multiple proxy locations of the processing device, one or more of the digital proxy signals being indicative of predicted processing tasks, the load of the processing device comprising a quantity of current to be delivered in a power signal supplied to the processing device to maintain a target voltage of a device terminal; and
changing a magnitude of the power signal supplied to the processing device based, at least in part on the predicted load of the processing device and/or change in the load of the processing device.

2. The method of claim 1, wherein changing the magnitude of the power signal supplied to the processing device comprises increasing or decreasing a number of voltage header circuits to be coupled between a voltage source and the processing device.

3. The method of claim 1, wherein changing the magnitude of the power signal supplied to the processing device further comprises:
computing a first control signal based, at least in part, on an applied voltage signal; and
selecting between the first control signal and a second control signal, the second control signal being determined based on the estimated and/or predicted load of the processing device, for determination of the magnitude of the power signal to be supplied to the processing device based, at least in part, on a change in the estimated and/or predicted load of the processing device.

4. The method of claim 3, and further comprising:
connecting a number of transistor circuits between a source voltage and a power input terminal of the processing device responsive to a control signal selected from between the first control signal and a second control signal.

5. An integrated circuit (IC) die, comprising:
circuitry to form a processing device;
circuitry to predict a load of the processing device and/or change in the load of the processing device based, at least in part, on a sum of digital proxy signals obtained from multiple proxy locations of the processing device, one or more of the digital proxy signals being indicative of predicted processing tasks, the load of the processing device to comprise a quantity of current of a power signal to be delivered to the processing device to maintain a target voltage of a device terminal; and circuitry to change a magnitude of the power signal to be supplied to the processing device based, at least in part on the predicted load of the processing device and/or change in the load of the processing device.

6. The IC die of claim 5, wherein change in the magnitude of the power signal supplied to the processing device to be changed responsive to an increase or decrease in a number of voltage header circuits to be coupled between a voltage source and the processing device.

7. The IC die of claim 5, wherein the processing device is formed in a processor circuit, and wherein the load of the processing device and/or change in the load to be predicted based, at least in part, on observations of signals received from proxy locations of the processor circuit.

8. The IC die of claim 5, wherein circuitry to change a magnitude of a power signal to be supplied to the processing device to comprise:

circuitry to compute a first control signal based, at least in part, on an applied voltage signal; and circuitry to select between the first control signal and a second control signal, the second control signal to be determined based on the predicted load of the processing device, for determination of the magnitude of the power signal to be supplied to the processing device based, at least in part, on a change in the predicted load of the processing device.

9. The IC die of claim 8, and further comprising:

circuitry to connect a number of transistor circuits between a source voltage and a power input terminal of the processing device responsive to a control signal selected from between the first control signal and a second control signal.

10. An article comprising:

a non-transitory storage medium comprising computer-readable instructions stored thereon that are executable by one or more processors of a computing device to:

express circuitry to form a processing device;

express circuitry to predict a load of the processing device and/or change in the load of the processing device based, at least in part, on a sum of digital proxy signals obtained from multiple proxy locations of the processing device, one or more of the digital proxy signals being indicative of predicted processing tasks, the load of the processing device to comprise a quantity of current of a power signal to be delivered to the processing device to maintain a target voltage of a device terminal; and express circuitry to change a magnitude of the power signal to be supplied to the processing device based, at least in part on the predicted load of the processing device and/or change in the load of the processing device.

11. The article of claim 10, wherein change in the magnitude of the power signal supplied to the processing device to be changed responsive to an increase or decrease in a number of voltage header circuits to be coupled between a voltage source and the processing device.

12. The article of claim 10, wherein the processing device is formed in a processor circuit, and wherein the load of the processing device and/or change in the load of the processing device to be predicted based, at least in part, on observations of signals received from proxy locations of the processor circuit.

13. The article of claim 10, wherein circuitry to change a magnitude of a power signal to be supplied to the processing device to comprise:

circuitry to compute a first control signal based, at least in part, on an applied voltage signal; and circuitry to select between the first control signal and a second control signal, the second control signal to be determined based on the predicted load of the processing device, for determination of the magnitude of the power signal to be supplied to the processing device based, at least in part, on a change in the predicted load of the processing device.

14. The article of claim 13, and wherein the instructions are further executable by the one or more processors to:

express circuitry to connect a number of transistor circuits between a source voltage and a power input terminal of the processing device responsive to a control signal selected from between the first control signal and a second control signal.

* * * * *